United States Patent
Süther

(10) Patent No.: US 8,312,985 B2
(45) Date of Patent: Nov. 20, 2012

(54) TOOL-FREE REPLACEMENT OF BOTTLE GUIDE CURVES

(75) Inventor: Werner Süther, Windesheim (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/143,580

(22) PCT Filed: Mar. 26, 2010

(86) PCT No.: PCT/EP2010/001902
§ 371 (c)(1),
(2), (4) Date: Jul. 7, 2011

(87) PCT Pub. No.: WO2010/124770
PCT Pub. Date: Nov. 4, 2010

(65) Prior Publication Data
US 2011/0290622 A1    Dec. 1, 2011

(30) Foreign Application Priority Data
Apr. 27, 2009 (DE) .......................... 10 2009 018 731

(51) Int. Cl.
*B65G 37/00* (2006.01)
(52) U.S. Cl. .................................. 198/473.1; 198/481.1
(58) Field of Classification Search ............... 198/473.1, 198/480.1, 478.1, 479.1, 481.1
See application file for complete search history.

(56) References Cited

U.S. PATENT DOCUMENTS

| | | | |
|---|---|---|---|
| 5,056,650 A * | 10/1991 | Kronseder | 198/473.1 |
| 5,082,105 A * | 1/1992 | Tincati | 198/473.1 |
| 5,582,285 A | 12/1996 | Kronseder | |
| 5,732,528 A | 3/1998 | Peronek et al. | |
| 5,784,857 A | 7/1998 | Ford et al. | |
| 7,273,144 B2 | 9/2007 | Guernieri et al. | |
| 7,748,522 B2 | 7/2010 | Reiner | |
| 7,832,546 B2 * | 11/2010 | Preti et al. | 198/473.1 |
| 2008/0279621 A1 | 11/2008 | Chaupin | |

FOREIGN PATENT DOCUMENTS

| | | |
|---|---|---|
| DE | 4010990 | 10/1991 |
| DE | 19539694 | 5/1996 |
| DE | 102004056858 | 6/2006 |
| EP | 1574460 | 9/2006 |
| WO | 97/45347 | 12/1997 |

* cited by examiner

*Primary Examiner* — James R Bidwell
(74) *Attorney, Agent, or Firm* — Occhiuti Rohlicek & Tsao LLP

(57) ABSTRACT

A guide element for containers includes partial guide elements that can be interconnected by a connecting element having first and second partial connecting elements that can be force-locked together. One of the partial connecting elements includes a lockable receptacle into which the other partial connecting element can be inserted by its insertion end, the insertion end corresponding to the receptacle, such that the first partial connecting element, when in an unlocked condition, is held securely in position and supported by the second partial connecting element, and one partial connecting element is held securely in position on the other partial connecting element by form-fit when the lockable receptacle is locked.

16 Claims, 4 Drawing Sheets

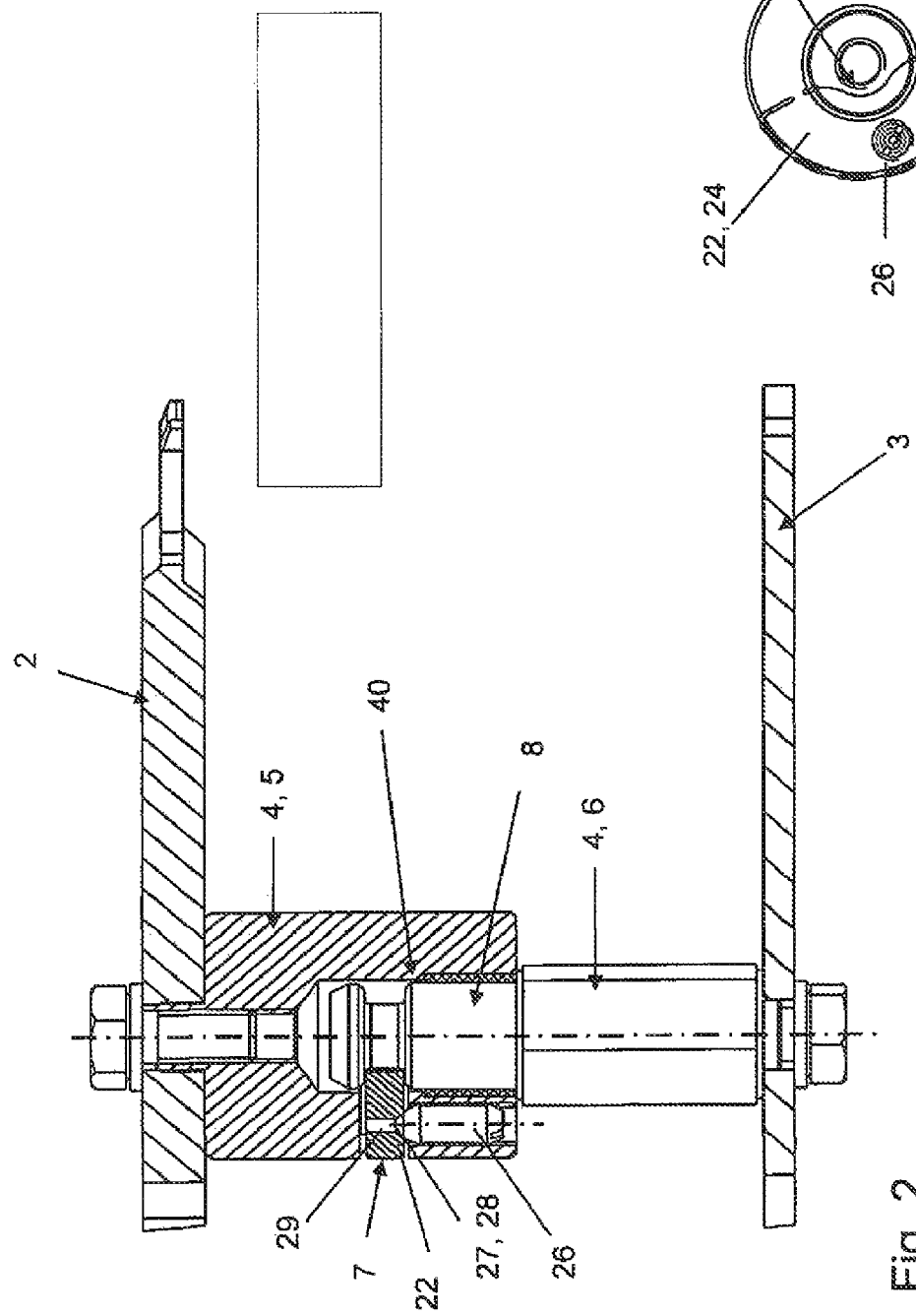
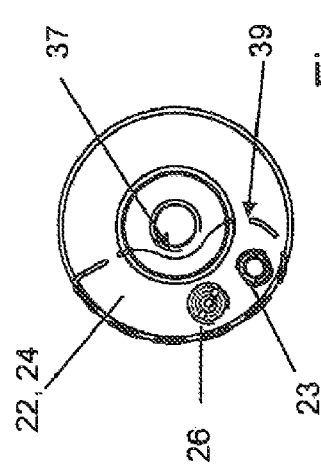
Fig. 2
Fig. 3

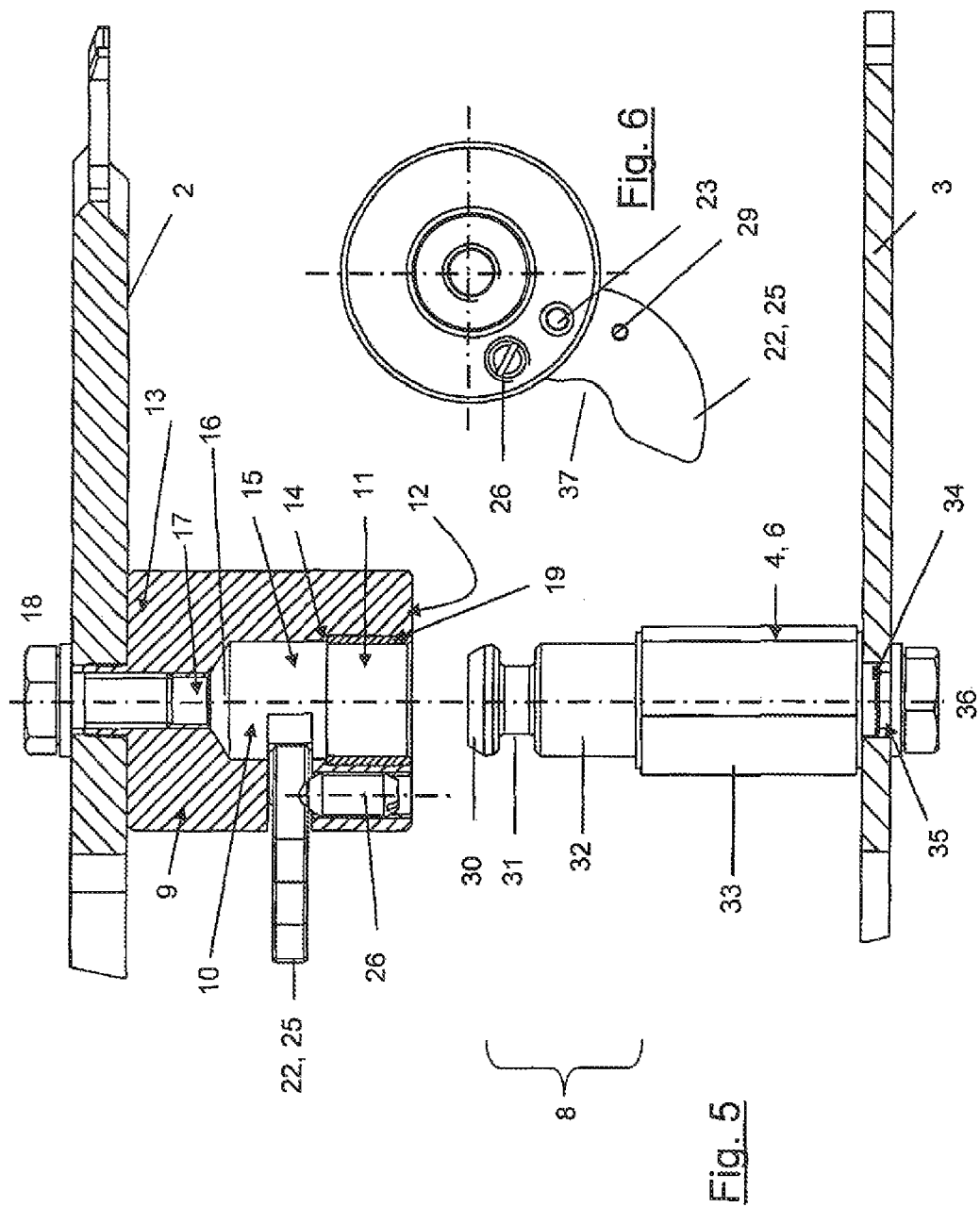

TOOL-FREE REPLACEMENT OF BOTTLE GUIDE CURVES

CROSS-REFERENCE TO RELATED APPLICATIONS

This application is the National Stage of International Application No. PCT/EP2010/001902, filed on Mar. 26, 2010, which claims the priority of German Patent Application No. 10 2009 018 731.6, filed on Apr. 27, 2009. The contents of both applications are hereby incorporated by reference in their entirety.

FIELD OF INVENTION

The invention relates to a guide element comprising partial guide elements that can be interconnected by means of at least one connecting element.

BACKGROUND

Such guide elements can be used for example in bottle handling machines, and are referred to hereinafter as bottle guide curves or bottle guide stars. Bottle handling machines can comprise fillers, cappers, labellers or the like, which convey bottles rotating, for example. The bottle guide curves exhibit partial guide elements, i.e. for example a neck guide element and an interchangeable element. The neck guide element can also be referred to as neck guide curve or neck guide star and the interchangeable element as replaceable guide star plate. The guide elements as a group are also frequently referred to as 'format parts' because they must be provided depending on the bottle format.

The bottle guide curves are each realised to match particular bottle diameters and bottle heights. The at least one connecting element or plurality of connecting elements is provided to ensure a certain distance—which is adapted accordingly to the bottle and/or bottle series that is to be handled—of the one partial guide element to the other partial guide element. The connecting elements are connected to the neck guide element on the one hand and to the replaceable star plate on the other. A screw connection is usually provided for this purpose, which means that the interspaced partial guide elements are interconnected by the connecting elements in a form-fit manner.

A bottle handling machine can handle multiple bottles which can exhibit different heights or also different diameters, for example in their belly region. Of course the bottle handling machines usually handle series of bottles having the same dimensions. When changing over to a new bottle series having the said different dimensions, the bottle partial guide elements must be adapted to the new dimensions. This is usually effected by an exchange of the partial guide elements concerned, preferentially the replaceable star plate.

As described hereinbefore however, the latter is connected by way of the connecting elements to the neck guide element in a form-fit manner, that is to say by screw-fitting. To effect the exchange therefore the screw connections concerned must be undone, which at present necessitates the use of a tool. Undoing each individual screw connection is very time-consuming and so has an adverse effect on the availability of the bottle handling machine. The existing replaceable star plate must also be exchanged for a replaceable star plate that matches the new dimensions of the bottle series, so that the substantial amount of time needed to establish the screw connections is involved. In this respect a considerable amount of time is needed for the changeover, which not only incurs enormous personnel costs but also shuts down the bottle handling machine, with the result that production, e.g. bottle filling or labelling and all upstream or downstream steps, is suspended.

From U.S. Pat. No. 5,732,528 B is known an improved embodiment wherein a stem-like element arranged on the upper bottle partial guide element can be introduced into an annular locking element attached to the lower bottle partial guide element. The upper bottle partial guide element can be fixed at different heights by way of a locking pin, whereby the locking pin must be introduced into one of the multiple grooves running around the first bottle partial guide element.

Embodiments are also know however wherein the connecting elements are firmly bonded, i.e. welded, to the partial guide elements concerned. In this case an exchange can only be effected by the complete bottle guide curve having to be exchanged.

SUMMARY

The object of the invention therefore is to provide a guide element of the type indicated at the outset and which is adaptable to new bottle dimensions in a simple manner.

According to the present invention the object is resolved by a guide element in which the at least one connecting element exhibits a first partial connecting element and a second partial connecting element, wherein the one partial connecting element comprises a lockable receptacle in which the insertion end of the other partial connecting element corresponding to the receptacle can be inserted, so that the one partial connecting element is positionally securely retained on the other partial connecting element in a force-fit manner when the lockable receptacle is locked.

The present invention advantageously provides a guide element whose partial guide elements, i.e. the neck guide element and the replaceable star plate, are interconnected only by a plug-and-socket connection of the two partial connecting elements, with the positional securing being established in a force-fit manner by way of the lockable receptacle. Contrary to the prior art, to exchange the replaceable star plate for example it is only necessary to unlock the lockable receptacle such that the partial connecting element inserted into the receptacle can be simply withdrawn from the receptacle. Conveniently, the lockable receptacle can be operated without tools in the process. Only when the lockable receptacle is jammed can a slackening or impact aid be resorted to in order to assist release. However a few blows are sufficient for assisted releasing, so the effort involved in changing/undoing the partial connecting elements interconnected in a force-fit manner is not especially adversely affected. Essentially, the lockable receptacle can be advantageously operated manually without tools.

In a favourable embodiment it is proposed that the one partial connecting element is arranged as a neck element on the neck guide element, with the other partial connecting element being arranged as a base element on the replaceable star plate. It is practicable if the neck element comprises the lockable receptacle, while the base element can be inserted into the receptacle by its insertion end. Of course it can also be provided for the insertion end to be disposed on the neck element and the lockable receptacle on the base element.

It is practicable if the two partial connecting elements are connected to the guide element concerned, which can be effected by way of a screw connection, for example. It is an advantage in this respect that the partial guide elements needed by the particular size of the bottle, and already preassembled with the respectively corresponding partial connecting elements, simply have to be inserted by the base elements into the neck elements and then to be locked. It is preferential here to exchange the replaceable star plate on which base elements having the height that is necessary in interaction with the neck element are disposed. This means that base elements suitable for the required height can be preassembled with the replaceable star plate, whereby the height of the neck elements, provided they or the neck guide element are not replaced, is specified. The preassembling with the required sizes can be effected before the actual change so that downtimes can also be reduced in this way.

For inserting the insertion end of the one partial connecting element into the receptacle of the other partial connecting element, it is advantageously provided that the corresponding partial connecting element, i.e. the neck element for example, is configured in the manner of a sleeve.

In a preferred embodiment the sleeve exhibits a stepped bore which can be configured continuously. Starting from the base end of the sleeve, a first bore section that is open to the base end is provided which is preferentially cylindrical when seen in longitudinal section. The first bore section merges with a step into a second bore section which has a smaller diameter than the first bore section but which is also preferentially cylindrical when seen in longitudinal section. A liner can be disposed in the first bore section. The second bore section merges via a conical transition section into a third bore section which has a smaller diameter than the second bore section. The third bore section emerges onto a fixing end lying opposite the base end. A female thread to accept a fixing bolt can be introduced into the third bore section. The fixing bolt can be used to fix the sleeve for example to the neck guide element which exhibits a corresponding opening to allow the fixing bolt to be inserted through. It is practicable if the corresponding partial connecting element, i.e. the neck element for example, comprises an engagement stub that engages in this opening, such that the third bore section can be introduced into the engagement stub. It is also conceivable to provide a tapped hole in the engagement stub, with the third bore section being able to terminate before the engagement stub.

In a preferred embodiment, a slot is introduced in the sleeve wall in the region of the second bore section. The slot is introduced into the sleeve wall in the manner of a secant and so opens the second bore section.

An actuatable key is arranged in the slot and is supported in the slot by a pivot in such a way that the key can be moved from an unlock position to a lock position and back. The key can be advantageously moved about the pivot to swivel into the desired position. The key can be realised in the manner of a segment of a circle having an inner face that is vaulted outward relative to a vertical median axis of the sleeve, or having an inner face that follows a linear profile. On its inner face the key preferentially exhibits a concave central region on which linear edge regions are disposed. When the key is in the lock position, its inner face engages in the second bore section such that the second bore section is intersected by the key or by the inner face of the key.

To keep the key in the lock position, beneficial provision is made for disposing in the sleeve wall a locating element whose engagement end engages in the slot. A bore into which the engagement end of the locating element engages is provided in the key. The locating element can be realised preferentially as a spring pin whose engagement end exhibits an engagement ball which engages in the bore when the key is in the lock position. When the key is moved from the unlock or opening position to the lock position, it pushes the engagement ball out of its relaxed position against the spring force.

When the key reaches its lock position the engagement ball moves under spring force towards its relaxed position and strikes against the key in the region of the bore, preferably so as to be readily audible. In this position the engagement ball engages under spring force some way into the bore so that the key is adequately located. At the same time the noise of the impact advises the operator of the correct position of the key. It is advantageous if a recessed area is introduced in the sleeve wall adjacent to the slot. When the key is in its lock position, a kind of nose is present on the key so that the key can be easily actuated or gripped by the nose because the latter projects out above the wall of the sleeve relative to the recessed area.

The other partial connecting element, for example as a base element, is advantageously realised in particular with its insertion end matching the sleeve, in particular matching the latter's through bore or the latter's bore sections. The other partial connecting element, for example as a base element, is realised at its insertion end preferentially in the form of a mushroom having a mushroom head and a mushroom stem, the mushroom stem being smaller in diameter than a contact region and than the mushroom head. When viewed axially, the mushroom stem is arranged between the mushroom head and the contact region. Lying opposite the mushroom head the base element exhibits an actuating region which is realised preferably polygonally, mostly as a hexagon, and which can therefore be used as spanner flats.

The diameter of the contact region is preferentially matched to the second bore section of the sleeve such that an annular gap between the contact region and the first bore section of the sleeve is created when the base element is inserted into the sleeve by its insertion end. The liner previously referred to is disposed in this annular gap. The wall thickness of the liner is preferentially somewhat greater than the height of the step between the first and second bore section. Consequently the contact region can be in contact with the liner and be spaced by a gap from the second bore section. When in the inserted state, the contact region engages some way into the second bore section such that the mushroom head when viewed axially is disposed within the second bore section, that is to say with its head end axially at some distance from the conical transition section. When in the inserted state the base element lies preferentially with its actuating region and/or its contact face against the corresponding face of the base end.

To insert the one partial connecting element into the other, i.e. to insert the base element, for example, into the neck element, the key is placed in its unlock or opening position. When the base element is inserted into the neck element, the key is moved into its lock position. In its lock position the key is in contact with a lower face of the mushroom head that is opposite its head end on the one hand, and with the corresponding face of the contact region on the other hand. Preferentially the thickness of the key is realised to match the form of the mushroom stem such that the key clamps the base element securely in position in the neck element or in the through bore of the neck element by force-fit.

It is practicable in the interest of the present invention for a tapped hole to be provided in the actuating region and opposite the mushroom head, so as to be able to adequately connect the base end with the replaceable star plate, and for a through opening to be provided at an appropriate point in the star plate for this purpose. Here again, an engagement section can be provided on the base element which engages in the opening.

Overall, the present invention provides a guide element or a bottle guide curve or bottle guide star whose partial guide elements (also known as replaceable parts or format parts), preferentially the replaceable element, are interchangeable without tools. To this end it is advantageously proposed to realise the one partial connecting element as a male and the other partial connecting element as a female element, which can be connected mated one into the other and sufficiently secured in position by the key or lever. By simply moving the key into its lock position the partial connecting elements that are mated one into the other are interconnected by force-fit. The so-called replaceable parts are removed in a correspondingly short time by simply moving the key into its unlock or open position and the partial connecting elements being disengaged. The very simple mating connection with the pivotable key therefore provides a very simple method for fitting the replaceable parts, thereby very significantly reducing the downtimes of the bottle handling machine. But even after a crash, any damage can also be rapidly rectified in this way. The inventive guide element is suitable for the handling of both glass bottles and plastic bottles, e.g. PET bottles.

BRIEF DESCRIPTION OF THE DRAWINGS

Further advantageous embodiments of the invention are disclosed in the dependent claims and the following description of the figures. In the figures,

DETAILED DESCRIPTION

Figure 1:
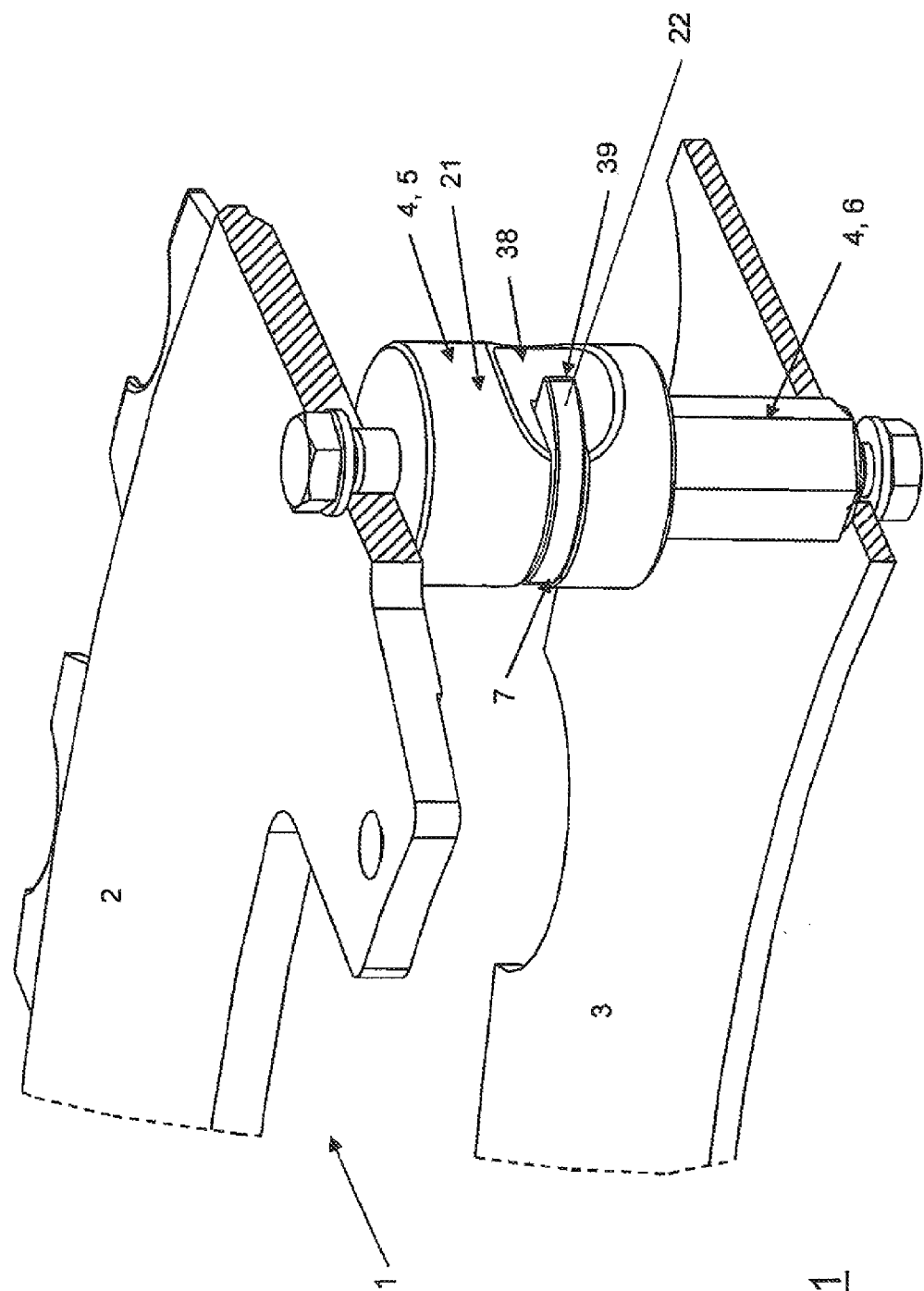
Figure 4:
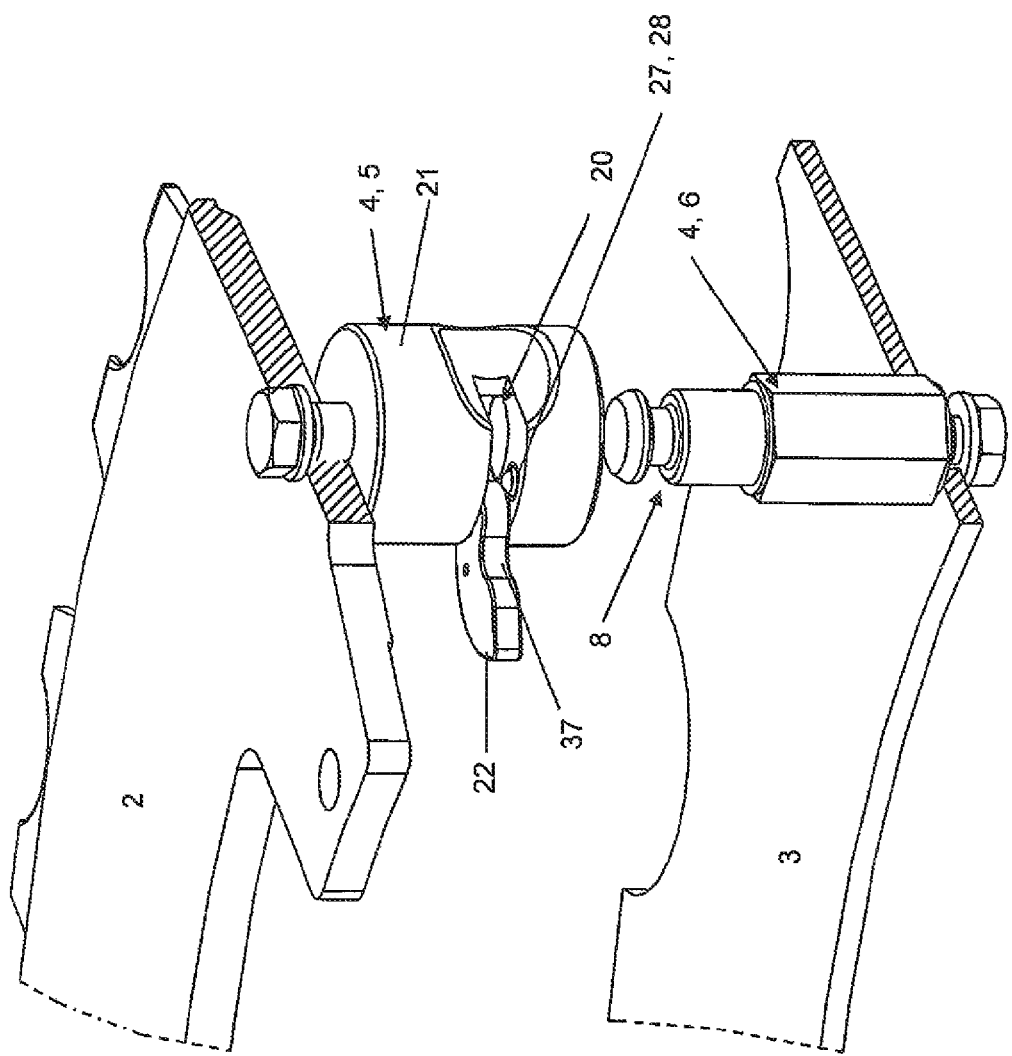

F*ig.* 2 shows the guide element in FIG. 1 in a longitudinal section through a connecting element, FIG. 3 shows a plan view of the connecting element in FIG. 2, FIG. 4 shows the guide element in FIG. 1 in the separated condition in perspective view, FIG. 5 shows the illustration in FIG. 5 as a longitudinal section, and FIG. 6 shows a plan view of a neck element as a detail in the unlocked position.

In the different figures, identical parts are identified by the same reference character in each case, which is why they are generally described only once.

FIG. 1 shows a guide element 1 which can be designated as a bottle guide curve or bottle guide star. Guide element 1 comprises partial guide elements 2, 3 which are also referred to hereinbelow as neck guide element 2 and also as replaceable element 3 or as replaceable star plate 3. The two partial guide elements 2, 3 are interconnected by at least one connecting element 4. Only one connecting element 4 is depicted in each of the Figures. A plurality of connecting elements 4 can also be provided of course.

Connecting element 4 is formed from a first partial connecting element 5 and a second partial connecting element 6. By way of example, the first partial connecting element 5 is disposed as neck element 5 on neck guide element 2, while the second partial connecting element 6 is disposed as base element 6 on replaceable star plate 3.

Neck element 5 comprises a lockable receptacle 7. In the depicted embodiment, base element 6 is inserted by its insertion end 8 (FIG. 2) into neck element 5 and held by force-fit in position by lockable receptacle 7, with the lockable receptacle 7 being locked.

Neck element 5 is configured in the manner of a sleeve 9. By way of example, a stepped through hole 10 is introduced into sleeve 9 (FIG. 5). Through bore 10 exhibits a first bore section 11 which extends from a base end 12 of sleeve 9 towards an opposite fixing end 13. First bore section 11 is open to the base end 12 and displays a cylindrical configuration when viewed in longitudinal section. First bore section 11 merges via a step 14 into a second bore section 15 that has a smaller diameter than first bore section 11. Second bore section 15 merges via a conically tapering transition section 16 into a third bore section 17. Third bore section 17 is continued into an engagement stub of neck element 5 and emerges in the plane of the drawing above fixing end 13. A female thread for receiving a fixing bolt 18 is provided in third bore section 17. Neck element 5 can be connected to neck guide element 2 by way of fixing bolt 18.

As shown in FIG. 5, first bore section 11 comprises a liner 19 whose wall thickness is such that the inner wall of liner 19 projects radially above step 14. Consequently step 14 can be referred to as a stop.

As can be seen from FIG. 4, a slot 20 is introduced in the region of second bore section 15 of sleeve 9. Slot 20 is disposed in wall 21 of sleeve 9 in the manner of a secant. A key 22 is arranged in slot 20. Key 22 is able to swivel in slot 20 about a pivot 23 (FIG. 6). Key 22 can be moved or swivelled about pivot 23 into a lock position 24 (FIG. 3) and an opening position or unlock position 25 (FIG. 6) and back.

Lockable receptacle 7 is therefore advantageously formed from bore 10 or from through bore 10 and key 22 that is pivotally supported in slot 20.

A locating element 26 which engages by its engagement end 27 in slot 20 (FIG. 4) is also disposed in sleeve wall 21. Locating element 26 can be provided as a spring element or spring pin which exhibits an engagement ball 28 at its engagement end 27. Corresponding to engagement ball 28, key 22 exhibits a through bore 29 which will be described further hereinbelow.

In the exemplary embodiment, base element 6 exhibits at its insertion end 8 a mushroom-shaped conformation with a mushroom head 30 and a mushroom stem 31. Mushroom stem 31 has a smaller diameter than a contact region 32 of insertion end 8. When viewed in the axial direction of base element 6, mushroom stem 31 is disposed between mushroom head 30 and contact region 32.

Opposite mushroom head 30, base element 6 comprises an actuating region 33 which is executed as a hexagon by way of example. Opposite mushroom head 30, actuating region 33 exhibits an engagement section 34 that is smaller in diameter than actuating region 33. Base element 6 engages by engagement section 34 in a bore 35 created in replaceable star plate 3. Engagement section 34 comprises a tapped bore into which a fixing bolt 36 can be screwed so that replaceable star plate 3 can be adequately connected to base element 6.

As is depicted by way of example, key 22 is dimensioned to match the size of mushroom stem 31. In this respect the thickness of key 22 is preferentially selected so that when in its lock position 24, key 22 can on the one hand be in contact with a lower face of mushroom head 30 shown in the plane of the drawing and on the other hand with an upper face of contact region 32 disposed in the plane of the drawing, as FIG. 2 shows for example.

In the exemplary embodiment, key 22 exhibits a preferably concave inner face 37 which runs curved relative to the vertical axis of neck element 5 and which is executed such that it engages in second bore section 15 when key 22 is disposed in his lock position 24. By way of example, FIG. 3 shows that inner face 37 of key 22 intersects second bore section 15. Inner face 37 is preferentially provided with a concave central region that is bounded by linear edge regions.

As can be clearly seen particularly from FIG. 1, a recessed area 38 or hollow is provided in sleeve wall 21 adjacent to slot 20, forming a sort of nose 39 of key 22 which can be easily gripped. The plan view in FIG. 3 clearly shows that nose 39 does not project out beyond the actual outer periphery of sleeve wall 21 but projects only within the limit of recessed area 38 which is favourably provided so that key 22 can be easily operated by nose 39 when key 22 is to be moved to its opening position.

Starting with the two partial guide elements 2 and 3 (FIGS. 4 and 5) in the separated condition, neck guide element 2 is connected to replaceable star plate 3 in the following manner.

First, insertion end 8 of base element 6 is inserted into through bore 10 of neck element 5. The key is moved to opening position 25 for this purpose. Contact region 32 of the base element is now in contact with liner 19 and engaged part-way into second bore section 15. The outer periphery of contact region 32 is spaced some way from second bore section 15 such that an annular gap 40 is formed. Mushroom stem 31 and mushroom head 30 extend fully into second bore section 15. When viewed in the vertical direction relative to the plane of the drawing, mushroom head 30 is received by its head end in second bore section 15 at a distance from conical transition section 16. When base element 6 is inserted into neck element 5 by its insertion end 8, key 22 is moved into its lock position 24. In the process, key 22 comes into contact with engagement ball 28 and deflects it downward against the spring force in the depicted plane of the drawing, until the through bore 29 is axially positioned over the engagement ball 28. Under spring force, engagement ball 28 is now moved to its relaxed position but lies against the corresponding side of key 22 under spring force. The contact of engagement ball 28 with key 22 or the partial entry of engagement ball 28 into through bore 29 is audibly perceptible in the preferred embodiment.

In this way base element 6 is connected to neck element 5 with adequate positional security. Consequently neck guide element 2 and replaceable star plate 3 are also interconnected. To change the replaceable star plate 3, only the particular key 22 must now be moved from its lock position 24 to its unlock or opening position 25 in order to allow base element 6 to be easily removed from neck element 6 by this release. A replaceable star plate 3 adapted to the new circumstances can now be connected to neck guide element 2 in a manner that is simple and time-saving.

The depicted embodiment according to FIGS. 1 to 6 shows a one-piece neck element 5 or base element 6. It is of course possible to provide a multiple-piece partial connecting element 5 or 6. Base element 6 in particular can be realised in a plurality of pieces, preferably in two pieces. It is conceivable for the insertion end 8 to be provided as a separate element for actuating region 33 and which can be pre-assembled by way of a screw connection for example. This is advantageous to the extent that insertion end 8 having its configuration matched to through bore 10 of neck element 5 can be universally connectable with differently realised actuation regions 33. In this way differently realised actuation regions 33 can be connected to the universal insertion end 8, particularly in their axial extension. This significantly reduces stock-keeping costs. Moreover the different components adapted to the particular bottle size can be pre-assembled to allow a change of the format parts and/or replaceable star plate 3 to be performed during a very brief plant outage because a simple, lockable plug connection is available. However not only the axial distance as seen in the vertical direction can be adapted in this way, a star plate that is adapted to suit different bottle diameters can also be changed in a very short time by this method. For this purpose too, the individual components adapted to the bottle series concerned can be pre-assembled before the actual plant outage.

Reference List
1 Guide element or bottle guide curve
2 Partial guide element of neck guide element
3 Partial guide element or replaceable star plate
4 Connecting element
5 First partial connecting element or neck element
6 Second partial connecting element or base element
7 Lockable receptacle
8 Insertion end of 6
9 Sleeve
10 Through bore
11 First bore section
12 Base end
13 Fixing end
14 Step
15 Second bore section
16 Transitional region
17 Third bore section
18 Fixing bolt to 2
19 Liner
20 Slot
21 Wall of 9
22 Key
23 Pivot
24 Lock position
25 Unlock position
26 Locating element
27 Engagement end
28 Engagement ball
29 Through bore in 22
30 Mushroom head
31 Mushroom stem
32 Contact region
33 Actuation region
34 Engagement section
35 Bore
36 Fixing bolt to 3
37 Inside of 22
38 Recessed area
39 Nose
40 Annular gap between 32 and 15

The invention claimed is:

1. A guide element for containers, said guide element comprising:
partial guide elements that can be interconnected by at least one connecting element,
wherein the at least one connecting element includes a first partial connecting element, and a second partial connecting element,
wherein the first and second partial connecting elements can be force-locked together,
wherein one of the first and second partial connecting elements includes a lockable receptacle into which the other partial connecting element can be inserted by an insertion end thereof, the insertion end corresponding to the receptacle, such that the first partial connecting element, when in an unlocked condition, is held securely in position and supported by the second partial connecting element, and one partial connecting element is held securely in position on the other partial connecting element by form-fit when the lockable receptacle is locked.

2. The guide element of claim 1,
wherein the first partial connecting element comprises a neck element disposed on a neck guide element, and
wherein the second partial connecting element comprises a base element disposed on a replaceable element.

3. The guide element of claim 1, wherein the first partial connecting element comprises the lockable receptacle.

4. The guide element of claim 1, wherein the first partial connecting element comprises a sleeve.

5. The guide element of claim 1,
wherein the first connecting element comprises a stepped bore having a first bore section that merges with a step into a second bore section, and
wherein the second bore section merges, via a conically tapering transition region, into a third bore section, the third bore section having a diameter that is smaller than a diameter of the second bore section.

6. The guide element of claim 5, further comprising a slot in the first partial connecting element, said slot opening into the second bore section of said first partial connecting element.

7. The guide element of claim 1, wherein the first partial connecting element comprises a key that is movable about a pivot from an unlock position to a lock position, and wherein the key is supported in a slot that is introduced in the first partial connecting element in the manner of a secant.

8. The guide element of claim 1, wherein the first partial connecting element comprises a recessed area in a wall thereof.

9. The guide element of claim 1, wherein the second partial connecting element comprises an insertion end in the shape of a mushroom, the insertion end including a mushroom head and a mushroom stem.

10. The guide element of claim 2, wherein the base element comprises a mushroom-shaped insertion end having a mushroom head and a mushroom stem.

11. The guide element of claim 2, wherein the neck element comprises the lockable receptacle.

12. The guide element of claim 2, wherein the neck element comprises a sleeve.

13. The guide element of claim 2, wherein the neck element comprises a stepped bore having first, second, and third bore sections, wherein the first bore section merges with a step into the second bore section, and the second bore section merges, via a conically tapering transition region, into the third bore section, the third bore section having a diameter that is smaller than a diameter of the second bore section.

14. The guide element of claim 13, further comprising a slot in said neck element, said slot opening into the second bore section.

15. The guide element of claim 2, wherein the neck element comprises a key that is movable between an unlock position and a lock position, wherein the key is supported in a slot in the neck element in the manner of a secant.

16. The guide element of claim 2, wherein the neck element comprises a recessed area in a wall thereof.

\* \* \* \* \*